United States Patent
Chen

(10) Patent No.: US 10,366,091 B2
(45) Date of Patent: Jul. 30, 2019

(54) EFFICIENT IMAGE FILE LOADING AND GARBAGE COLLECTION

(71) Applicant: Red Hat, Inc., Raleigh, NC (US)

(72) Inventor: Huamin Chen, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 348 days.

(21) Appl. No.: 15/240,736

(22) Filed: Aug. 18, 2016

(65) Prior Publication Data
US 2018/0052637 A1    Feb. 22, 2018

(51) Int. Cl.
| | | |
|---|---|---|
| G06F 17/30 | (2006.01) | |
| G06F 16/2457 | (2019.01) | |
| G06F 16/22 | (2019.01) | |
| G06F 12/02 | (2006.01) | |

(52) U.S. Cl.
CPC .... *G06F 16/24578* (2019.01); *G06F 12/0246* (2013.01); *G06F 16/22* (2019.01); *G06F 2212/1044* (2013.01); *G06F 2212/7205* (2013.01)

(58) Field of Classification Search
None
See application file for complete search history.

(56) References Cited

U.S. PATENT DOCUMENTS

| | | |
|---|---|---|
| 6,928,526 B1 | 8/2005 | Zhu et al. |
| 6,961,740 B2 | 11/2005 | O'Connor et al. |
| 7,584,338 B1 | 9/2009 | Bricker et al. |
| 8,396,905 B2 | 3/2013 | Provenzano |
| 8,631,052 B1 | 1/2014 | Shilane et al. |
| 9,256,467 B1 | 2/2016 | Singh et al. |
| 9,270,750 B1 | 2/2016 | Biberman et al. |
| 2005/0246337 A1* | 11/2005 | Forman ............ G06K 9/00154 |
| 2014/0049653 A1* | 2/2014 | Leonard ............ G06T 1/0042 348/207.1 |
| 2014/0244599 A1 | 8/2014 | Zhang et al. |

(Continued)

OTHER PUBLICATIONS

Command to Remove all Unused Images, Feb. 2014, Link: https://forums.docker.com/t/command-to-remove-all-unused-images/20 (6 pages).

(Continued)

*Primary Examiner* — Thu N Nguyen
(74) *Attorney, Agent, or Firm* — K&L Gates LLP

(57) ABSTRACT

Method for loading and garbage collecting image files. An example system includes two memories, processors, and a garbage collector including an I/O and a garbage collector engine. The I/O receives a request to load an image file from the first memory into the second memory. The garbage collector engine retrieves metadata including an identifying signature associated with a logical subunit. The garbage collector retrieves a plurality of identifying signatures, each identifying signature associated with a respective logical subunit from image files stored on the second memory. The garbage collector determines that the first identifying signature matches a third identifying signature from the plurality of identifying signatures, where the third identifying signature is associated with a third logical subunit. The garbage collector makes a copy of the third logical subunit, and uses this copy in place of the first logical subunit when loading the first image file to the second memory.

20 Claims, 4 Drawing Sheets

(56) References Cited

U.S. PATENT DOCUMENTS

2015/0304329 A1* 10/2015 Yan .................... H04L 67/10
726/27

OTHER PUBLICATIONS

DeLoof, Nicolas, Docker Garbage Collector, Dec. 4, 2015, Link: http://blog.loof.fr/2015/12/docker-garbage-collector.html (2 pages).
Image and Container Garbage Collection, Dec. 11, 2015, Link: https://github.com/docker/docker/issues/18601 (8 pages).
Docker Garbage Collection of Containers and Images, copyright 2016 GitHub, Inc., Link: https://github.com/spotify/docker-gc (7 pages).
Pull, copyright 2016, Link: https://docs.docker.com/engine/reference/commandline/pull/ (9 pages).

* cited by examiner

EFFICIENT IMAGE FILE LOADING AND GARBAGE COLLECTION

BACKGROUND

The present disclosure generally relates to improving the loading of image files to a local memory. In many settings, there are numerous possible image files that may be needed in a system to set up the environment to run applications on a local node. These image files may be stored in repositories which may be physically located a great distance away from the local node due to a variety of reasons, for example, physical hosting costs or a desire to keep repositories in a limited number of centralized locations while distributing local nodes over a wide geography.

SUMMARY

The present disclosure provides a new and innovative system, methods and apparatus for loading and garbage collecting image files. In an example, the system includes a first and a second memory, one or more processors in communication with the first and the second memory and a garbage collector including an input/output module and a garbage collector engine. A request to load a first image file located on the first memory into the second memory is received by the input/output module. This first image file includes a first plurality of logical subunits including a first logical subunit and a second logical subunit, where the first image file is associated with a first metadata that includes a first identifying signature associated with the first logical subunit and a second identifying signature associated with the second logical subunit. The garbage collector retrieves the first identifying signature from the first metadata. The garbage collector retrieves, from a first plurality of image files stored in the second memory an associated first plurality of identifying signatures. Each of these identifying signatures is associated with a respective second plurality of logical subunits. The garbage collector determines that the first identifying signature matches a third identifying signature from the first plurality of identifying signatures, where the third identifying signature is associated with a third logical subunit in a second image file of the first plurality of image files stored in the second memory. The garbage collector determines whether the second identifying signature matches any of the first plurality of identifying signatures. The garbage collector then makes a copy of the third logical subunit, and uses this copy in place of the first logical subunit when it loads the first image file to the second memory.

Additional features and advantages of the disclosed method and apparatus are described in, and will be apparent from, the following Detailed Description and the Figures.

DETAILED DESCRIPTION OF EXAMPLE EMBODIMENTS

Figure 1:
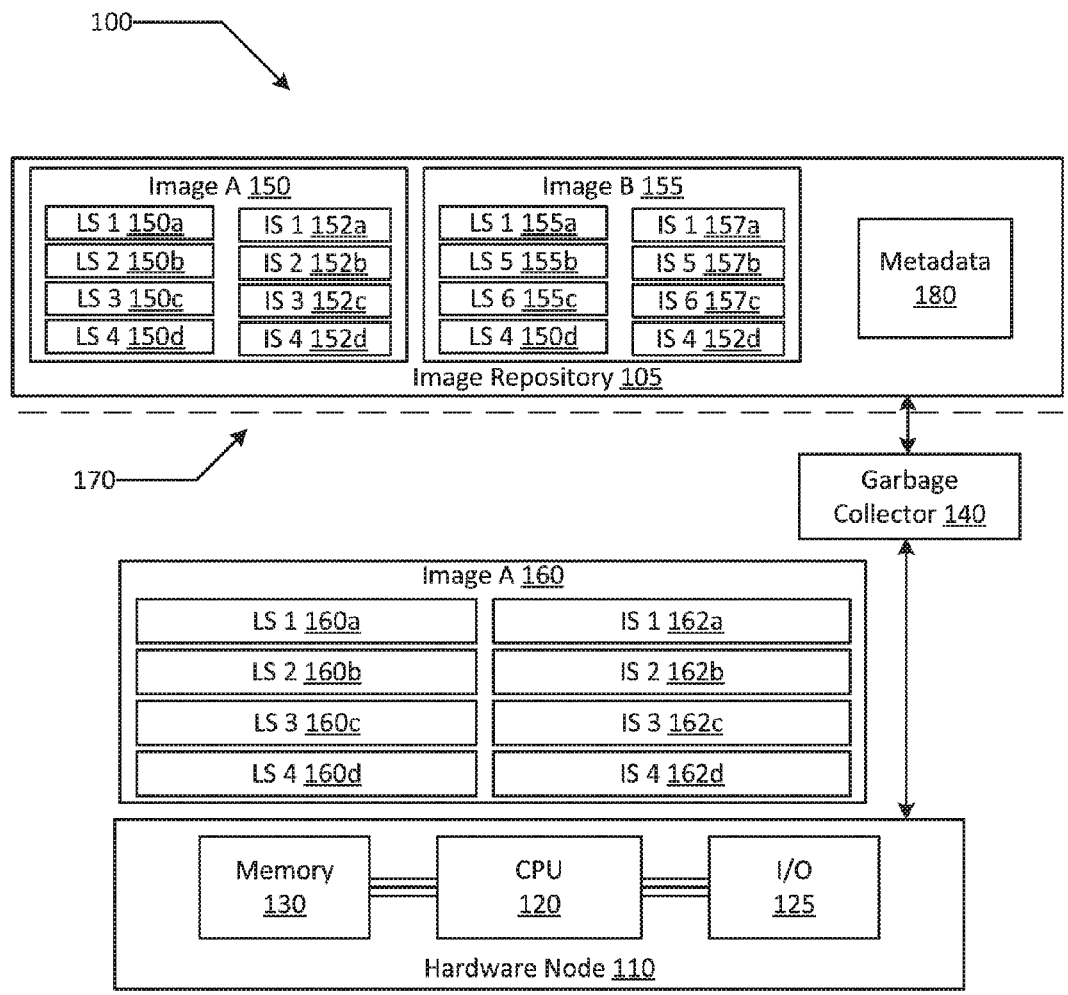
FIG. 1 is a block diagram of an example image loading and garbage collection system according to an example of the present disclosure.

In computer systems, image files can be used for creating hosting environments for running application programs. A computer system may use a container based virtualization system such as Docker, or a system where stand alone virtualized operating systems are created including the use of a hypervisor. The runtime environment necessary for the running of desired application code can be loaded onto the computer system in the form of an image file, for example, a Docker image file or an image file for building a virtual machine. These image files may be collections of logical subunits of data, for example, Docker layers or programs installed as part of a virtual machine build. These image files have a size that takes up space in a local memory device on the computer system, which fills up the local memory device's capacity. Garbage collection may also happen, for example, when the local memory device runs out of capacity, but an image file nonetheless needs to be loaded, where a garbage collector program on the computer system will identify and delete unused image files to create space for loading the newly requested image file.

Typically, when a request is made for garbage collection, one or more entire image file is deleted. Then the new image file to be loaded is retrieved from an image repository, for example, a Docker Image Registry. It may be ideal from a latency and bandwidth standpoint to always load files from a repository located in the same data center if not the same physical machine as the local memory, but where this is not possible, there is a challenge regarding the prioritization of the benefits of centralizing repositories in distant locations versus the speed and bandwidth impacts experienced at image file loading time. This image repository may be located in a centralized location over a network. Centralizing a repository has significant drawbacks, for example, a network retrieval step can incur network latency and risks of network failure, while centralizing the processing and I/O of image file retrieval can create a bottleneck where many local nodes need to wait for the image repository to process their requests. The present disclosure overcomes both of these speed hurdles by advantageously using data already stored in the local memory in the loading of image files, for example, by discovering and reusing layers of other Docker image files on the local system instead of loading those layers from the Docker Image Registry. The disclosed methods retrieve identifying signatures for logical subunits, for example, metadata for Docker image files located in the image registry including, for example, hash signatures or checksums for image file layers that uniquely identify the image file layers. If a logical subunit, for example, a Docker image file layer, exists in the local system, that layer is not deleted by the garbage collector, and the garbage collector utilizes the local copy to build the new image file being loaded rather than retrieving that layer from the image repository. In an example, there is a one-to-one uniquely identifying relationship between a logical subunit and its associated identifying signature, for example, between a Docker image file layer and the checksum of that file layer. The present disclosure may accordingly improve image file loading efficiency by reducing or eliminating the need to load image file layers from the image repository. Moreover, the present disclosure does not significantly increase the processing overhead incurred by the garbage collector program.

FIG. 1 depicts a block diagram of an example image loading and garbage collection system according to an example of the present disclosure. In an example, computer system 100 includes an image repository 105 which in turn includes multiple image files 150, and 155, which in turn include multiple logical subunits associated with identifying signatures: logical subunit ("LS") 150a may be associated with identifying signature ("IS") 152a, LS 150b with IS 152b, LS 150c with IS 152c, LS 150d with IS 152d, LS 155a with IS 157a, LS 155b with IS 157b, LS 155c with IS 157c, and LS 155d with IS 157d. For example, the image repository 105 may be a Docker Image Registry, or a storage node including virtual machine image files. This image repository 105, may be further separated from the rest of the system by a network 170. For example, the network 170 may be a public network (e.g., the Internet), a private network (e.g., a local area network (LAN) or wide area network (WAN)), or a combination thereof.

In an example, metadata 180 can be associated with image files 150 and 155 and image repository 105 using any suitable approach. For example, metadata 180 can be stored as part of image files 150 and 155 that includes the content (e.g., metadata 180 forms a header in a file). As another example, metadata 180 can be stored in a separate location from the content. In particular, metadata 180 can be stored in a metadata file (e.g., one file for each instance of content), a database (e.g., metadata database within an electronic device or within a particular application), remote location (e.g., a remote server), or any other suitable location. If the metadata 180 is stored separately from the content, the metadata 180 can be associated with the content using any suitable approach, including for example one or more references in the metadata 180 and/or content, pointers, links, or other combinations of these. Metadata 180 can include any suitable type of metadata. In an example, the image files 150 and 155 in the image repository 105, may be image files that are available to be loaded to a memory device 130, which may be part of a hardware node 110. In an example, garbage collector 140 may operate as a component of the hardware node 110 such as an executable program performing the functions of the garbage collector 140 in the present disclosure. For example, an executable program of the garbage collector 140 may be in a number of languages including ARM architecture assembly, Atmel AVR assembly, x86 assembly, Freescale 68HC11 assembly, Freescale v4e assembly, Motorola 680x0 assembly, MIPS assembly, PowerPC assembly, IBM System z assembly, TI MSP430 assembly, Zilog Z80 assembly, and machine code. In an example, hardware node 110 may include one or more physical processors (e.g., CPU 120) communicatively coupled to respective memory devices (e.g., memory 130) and input/output devices (e.g., I/O 125). As used herein, physical processor or processor (120) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130 refers to a volatile or non-volatile memory device, such as RAM, ROM, EEPROM, or any other device capable of storing data. As discussed herein, I/O device 125 refers to a device capable of providing an interface between one or more processor pins and an external device capable of inputting and/or outputting binary data.

Processors 120 may be interconnected using a variety of techniques, ranging from a point-to-point processor interconnect, to a system area network, such as an Ethernet-based network. Local connections within the garbage collector 140 including, for example, the connections between processor 120 and memory 130 and between processor 120 and I/O device 125 may be provided by one or more local buses of suitable architecture, for example, peripheral component interconnect (PCI).

In an example, the garbage collector 140 may operate to load an image file from the image repository 105 to the memory 130. In an example, the image repository may be another memory device of the same hardware node 110 or located over a network 170. In an example, the local memory 130 may include image file 160, which includes multiple logical subunits associated with identifying signatures: logical subunit ("LS") 160a may be associated with identifying signature ("IS") 162a, LS 160b with IS 162b, LS 160c with IS 162c, LS 160d with IS 162d.

Figure 2:
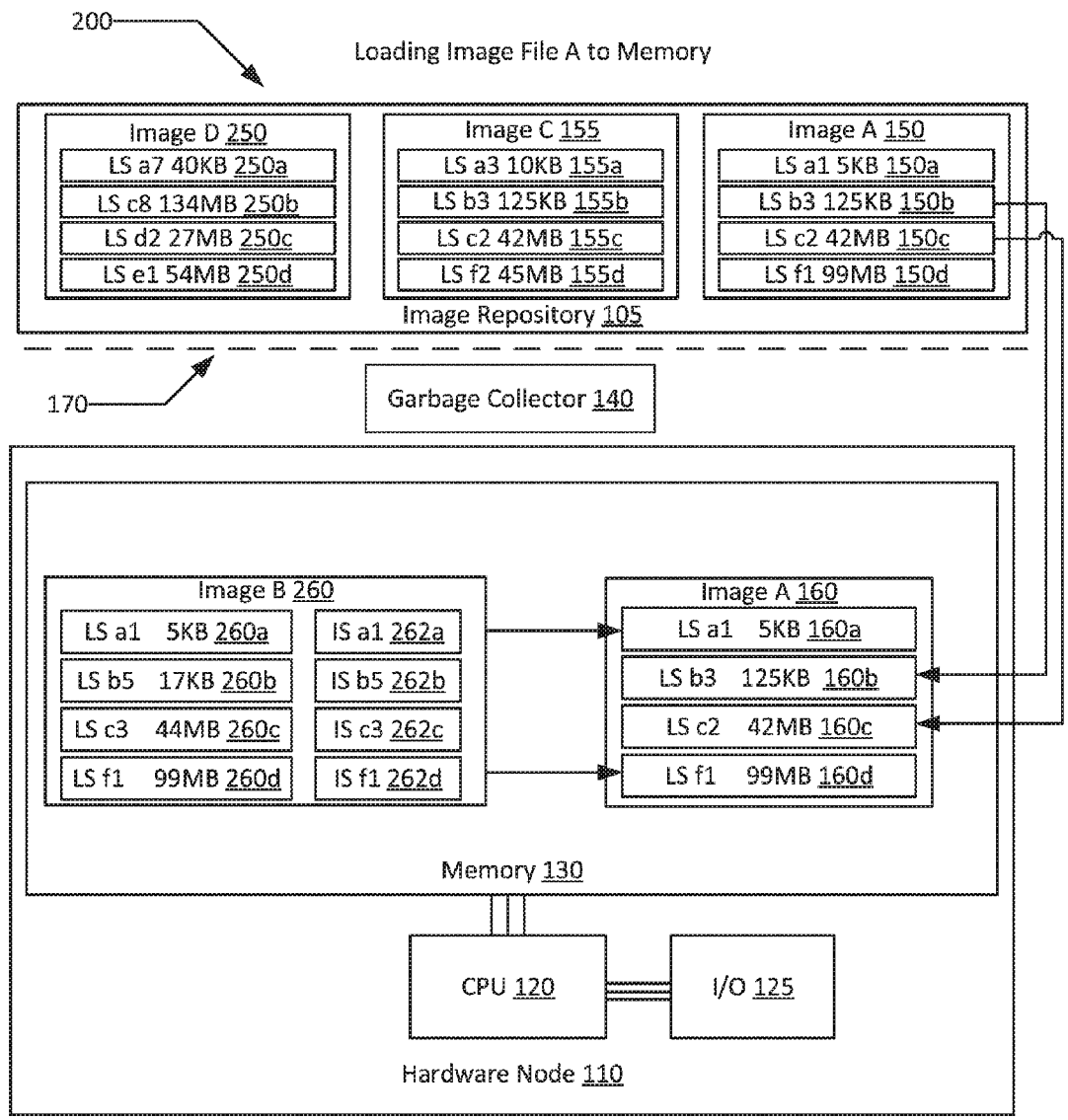
FIG. 2 is a block diagram showing an example of a system loading an image file according to an example of the present disclosure.

FIG. 2 depicts a block diagram showing an example of a system loading an image file according to an example of the present disclosure. FIG. 2 is an extension of FIG. 1 where as an example, in system 200, there is an image repository 105 including image files 150, 155, and 250, which in turn include logical subunits 150a, 150b, 150c, 150d, 155a, 155b, 155c, 155d, 250a, 250b, 250c, and 250d. Each of logical subunits 150a, 150b, 150c, 150d, 155a, 155b, 155c, 155d, 250a, 250b, 250c, and 250d may be associated with a respective identifying signature not depicted in the illustration, for example logical subunit ("LS") 150a may be associated with identifying signature ("IS") 152a, LS 150b with IS 152b, LS 150c with IS 152c, and LS 150d with IS 152d. In an example, the image repository 105 may be separated from the garbage collector 140 by a network 170. The garbage collector 140 operates in the processors (CPU 120) of hardware node 110 which are connected to an I/O device 125 and memory devices 130. The memory device 130 includes an image file 260 including logical subunits 260a, 260b, 260c, and 260d. In an example, the garbage collector 140 receives a request from the I/O 125 to load image file 150 located in the image repository 105 to the memory 130.

In an example, the image file Image A 150, is associated with metadata 180, for example, the metadata 180 may be a part of the file for image file 150 or metadata 180 may be a separate file including identifying characteristics of image file 150. In an example, metadata 180 includes identifying signatures for the logical subunits 150a, 150b, 150c, and 150d of image file 150. For example, identifying signatures may be hash or checksum identifiers for logical subunits (e.g., Docker image file layers). In an example, the garbage collector 140 requests from the image repository the identifying signatures for logical subunits 150a, 150b, 150c, and 150d. The garbage collector 140 may further retrieve from the memory device 130, a plurality of logical subunits (e.g., Docker image file layers), included within a plurality of image files, for example, image file Image B 260 and its logical subunits and the logical subunits associated identifying signatures. Logical subunit ("LS") 260a may be associated with identifying signature ("IS") 262a, LS 260b with IS 262b, LS 260c with IS 262c, LS 260d with IS 262d, each logical subunit being associated with a respective identifying signature (e.g., hash or checksum identifiers).

In an example, the garbage collector 140 may further evaluate and determine that an identifying signature for a logical subunit 150a, 150b, 150c, and 150d, of image file 150 matches an identifying signature for a logical subunit 260a, 260b, 260c, and 260d, of image file 260. For example, the garbage collector 140 may determine that the identifying signature of logical subunit 260a and 150a match and that the identifying signatures of logical subunit 260d and 150d match. In an example, the garbage collector 140 may copy logical subunits 260a and 260d, for example, to temporary storage in memory 130, and copy logical subunits 150b and 150c from the image repository 105. The garbage collector 140 may load the reconstituted copy of image file 150 to memory 130 in the form of image file 160 including logical subunits 160a, 160b, 160c, and 160d. In an example, image file 160 and image file 150 would both be identical copies of Image A, where logical subunit 160a may be a copy of logical subunit 260a and logical subunit 160d may be a copy of logical subunit 260d, each copy being made from the local copy of image file 260, and logical subunit 160b may be a copy of logical subunit 150b and logical subunit 160c may be a copy of logical subunit 150c made from image file 150 located in the image repository 105. In a further example, the copy of image file Image A 160 being loaded into the memory device 130 may have one or more logical subunits copied from one or more other image files already present in memory device 130 other than image file Image B 260.

In another example, the garbage collector 140 may retrieve a storage capacity of the memory device 130. The garbage collector 140 may also retrieve a file size of image file 150. In an example, the garbage collector 140 may determine that there is insufficient capacity in the memory device 130 to load image file 150. The garbage collector 140 may create a ranking of the image files stored in the memory device 130, and this ranking may be based on, among other criteria, the quantity of shared logical subunits between a particular image file and image file 150, the cumulative size of shared logical subunits between a particular image file and image file 150, the age of each image file, the frequency of use of each image file, and the size of each image file. This ranking data may be retrieved from metadata for the memory device 130 stored in a variety of formats (e.g., a file, a folder, a directory or a registry). In an example, the garbage collector 140 may propose one or more logical subunits or image files for deletion based on a ranking of the image files in the memory device 130. In an example, the garbage collector 140 could delete logical subunits and/or image files from the memory device 130 until there is sufficient capacity to load the image file 150. The selection of logical subunits and/or image files for deletion may be based on, for example, user input via the I/O 125 or a predetermined algorithm selected by the operator of the computer system utilizing the ranking of the image files. In another example, the garbage collector 140 may utilize a ranking to propose logical subunits and/or image files for deletion without there being a capacity shortage in memory device 130.

Figure 3:
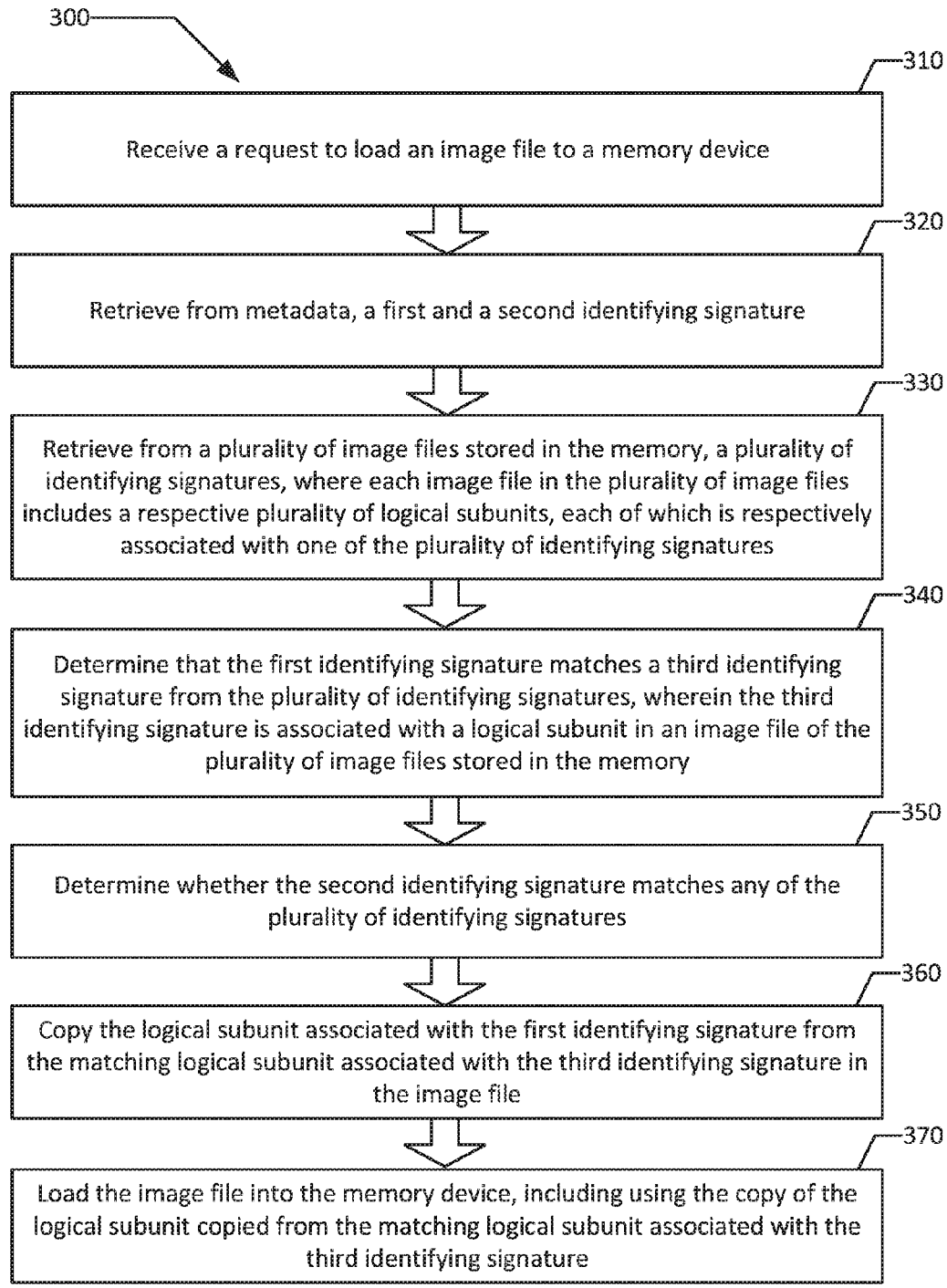
FIG. 3 is a flowchart illustrating an example process for loading an image file according to an example of the present disclosure.

FIG. 3 illustrates a flowchart illustrating an example process for loading an image file according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method is performed by a garbage collector 140.

The example method 300 starts with receiving a request to load a first image file to a second memory (block 310), where the first image file includes a first plurality of logical subunits, including a first logical subunit and a second logical subunit, where the first image file is associated with first metadata that includes a first identifying signature associated with the first logical subunit and a second identifying signature associated with the second logical subunit, the first image file being stored in a first memory. In an example using the illustrated system 200, garbage collector 140 may receive a request to load image file 150 to memory 130. Where image file 150 may include logical subunits 150a and 150b, and image file 150 may be associated with metadata 180, metadata 180 including identifying signatures 152a and 152b, logical subunit 150a being associated with identifying signature 152a, and logical subunit 150b being associated with identifying signature 152b. Image file 150 may be stored in image repository 105. In another example, image file 150 may have a size (e.g., 100 MB to 3 GB) and memory device 130 may have a capacity (e.g., 100 GB to 3 TB).

The first identifying signature and the second identifying signature are retrieved from the first metadata (block 320). In an example using the illustrated system 200, garbage collector 140 may retrieve identifying signatures 152a and 152b from metadata 180. In another example, identifying signatures 152a and 152b may be retrieved through a network 170.

A first plurality of identifying signatures is retrieved from a first plurality of image files stored in the second memory, where each image file of the first plurality of image files includes a respective second plurality of logical subunits, each of which is respectively associated with one of the first plurality of identifying signatures (block 330). In an example using the illustrated system 200, garbage collector 140 may retrieve identifying signature 262a associated with logical subunit 260a, identifying signature 262b associated with logical subunit 260b, identifying signature 262c associated with logical subunit 260c, and identifying signature 262d associated with logical subunit 260d. In an example, the garbage collector 140 may retrieve identifying signatures including 262a, 262b, 262c, and 262d from image file 260 or, for example, from metadata or other sources containing the identifying signatures. In another example, the garbage collector 140 may retrieve, for example, a file, a folder, a directory, a registry, or metadata from memory device 130 that may contain, for example, identifying signatures, sizes of logical subunits, or other information regarding, for example, the image files stored in memory device 130.

In another example, instead of retrieving information regarding the image files in the memory device 130 directly, the garbage collector 140 may query a prepared datasheet, for example, a file, a folder, a directory, a registry or metadata that includes, for example, the identifying signatures and storage locations of the logical subunits of the image files stored in the memory device 130. In an example, the garbage collector 140 may also retrieve an available storage capacity of the memory device 130, which can be compared to the size of the image file 150 to be loaded. This prepared datasheet may also include additional information such as the frequency of use of individual logical subunits.

The first identifying signature is then determined to match a third identifying signature from the first plurality of identifying signatures, where the third identifying signature is associated with a third logical subunit in a second image file of the first plurality of image files stored in the second memory (block 340). In an example using the illustrated system 200, garbage collector 140 may determine that identifying signature 152*a* matches identifying signature 262*a*, where identifying signature 262*a* is associated with logical subunit 260*a*, where logical subunit 260*a* may be a logical subunit of image file 260. In an example, determining that identifying signature 262*a* matches identifying signature 152*a* may confirm that the third logical subunit (260*a*) is identical to the first logical subunit (150*a*).

A further determination is made regarding whether the second identifying signature matches any of the first plurality of identifying signatures (block 350). In an example using the illustrated system 200, garbage collector 140 may determine that identifying signature 152*b* does not match any of the identifying signatures of any of the image files stored in memory device 130. In the example, finding that there is no matching copy of logical subunit 150*b* associated with identifying signature 152*b* located on memory device 130, the garbage collector 140 may copy logical subunit 150*b* directly from image repository 105, for example from image file 150. In an example, logical subunit 150*b* may be copied over a network 170.

The first logical subunit is then copied from the matching third logical subunit in the second image file (block 360). In an example using the illustrated system 200, garbage collector 140 may copy logical subunit 260*a*, which may be determined to be an exact copy of logical subunit 150*a*.

In another example, the garbage collector 140 may find that identifying signature 262*d* matches identifying signature 152*d*, which may indicate that logical subunit 260*d* matches logical subunit 150*d*, where logical subunit 150*d* is a logical subunit of image file 150. In an example, the garbage collector 140 may copy logical subunit 260*d* from the image file 260 on the local memory device 130. In another example, the garbage collector 140 may find that an additional identifying signature associated with an additional logical subunit of image file 150 matches the identifying signature of a logical subunit of an image file other than image file 260 that is stored on memory device 130. The garbage collector 140 may copy this additional logical subunit from the additional image file stored on memory device 130 that is not depicted.

The first image file is then loaded into the second memory including using the copy of the first logical subunit from the matching third logical subunit (block 370). In an example using the illustrated system 200, garbage collector 140 may load a copy of image file 150 to memory device 130 using the copy of logical subunit 260*a* made from image file 260 located on memory device 130 to create image file 160 on memory device 130. In the illustrated example 200, image file 160 may be created by the garbage collector 140 copying logical subunits 260*a* and 260*d* from image file 260 on memory device 130, and logical subunits 150*b* and 150*c* from the image repository 105. In another example, prior to loading image file 160 to memory device 130, the garbage collector 140 may determine whether there is enough storage capacity in memory device 130 to store image file 160.

In an example method, a ranking of a second plurality of image files stored in the second memory based on criteria including an overlap of shared logical subunits with the first image file, an age of each respective image file, a frequency of use of each respective image file, and/or a size of each respective image file may be created. In an example, the garbage collector 140 may create a ranking of image files stored in the memory device 130, this ranking may be based on, among other criteria, the quantity of shared logical subunits between a particular image file in memory device 130 and image file 150, the cumulative size of shared logical subunits between a particular image file in memory device 130 and image file 150, the age of each image file in memory device 130, the frequency of use of each image file in memory device 130 and the size of each image file in memory device 130. In an example, this ranking may be created upon determination by the garbage collector 140 that there is insufficient capacity in the memory device 130 to load the image file 160 to the memory device 130.

An example method may propose at least one image file and/or logical subunit to be deleted based on the ranking. In an example, garbage collector 140 may propose one or more logical subunits and/or image files for deletion based on a ranking of the image files and/or logical subunits in the memory device 130. In an example, the garbage collector 140 could delete logical subunits and/or image files from the memory device 130, for example, to create sufficient capacity to load the image file 160, or to clear space in the memory device 130 for other uses. The selection of logical subunits and/or image files for deletion may be based on, for example, user input via the I/O 125 or a predetermined algorithm selected by the operator of the computer system utilizing the ranking of the image files. In an example, certain logical subunits may be exempted from deletion, for example, a logical subunit may be frequently used and therefore beneficial to keep in memory device 130 to avoid reloading from the image repository 105. An example method may then delete one or more image files and/or one or more logical subunits. In an example, the garbage collector 140 could delete image file 260 or logical subunit 260*b* from memory device 130.

In an example, a ranking of a second plurality of image files stored in the second memory is based on (i) an aggregate size of logical subunits with identifying signatures matching identifying signatures of the first plurality of logical subunits of the first image file and/or (ii) a total quantity of logical subunits with identifying signatures matching identifying signatures of the first plurality of logical subunits of the first image file may be created. In an example, the garbage collector 140 may create a ranking of the image files stored in the memory device 130 or retrieve a pre-calculated ranking of the image files stored in the memory device 130 based on an aggregate size of logical subunits in a particular image file with identifying signatures matching identifying signatures of the logical subunits of the image file 150 to be loaded. In another example, the garbage collector 140 may also create a ranking of the image files stored in the memory device 130 or retrieve a pre-calculated ranking of the image files stored in the memory device 130 based on the total quantity of logical subunits in a particular image file with identifying signatures matching identifying signatures of the logical subunits of the image file 150 to be loaded. In an example, rankings may be used to determine candidate image files and/or logical subunits for deletion or reuse.

In an example method, there is a first list of logical subunits, where each member of the first list is a logical subunit included in a third image file in the second memory, each member of the first list having a size and an associated identifying signature that matches any identifying signature of the first image file. There is also a second list of logical subunits, where each member of the second list is a logical subunit included in a fourth image file in the second memory, each member of the second list having a size and an associated identifying signature that matches any identifying signature of the first image file. In the example, a determination may be made of a first cumulative size based on a first sum of respective sizes of each logical subunit in the first list and a second cumulative size based on a second sum of respective sizes of each logical subunit in the second list. In an example, the garbage collector 140 may determine, for a plurality of the image files stored in the memory device 130, the cumulative size of the logical subunits from each of the plurality of image files stored in the memory device 130 that match logical subunits from the image file to be loaded, image file 150.

In an example, the first cumulative size may be determined to be greater than the second cumulative size. In an example, the garbage collector 140, may determine that one image file of the plurality of image files stored in the memory device 130 has a greater cumulative size of matching logical subunits with image file 150 than another image file of the plurality of image files stored in the memory device 130. In an example, it may also be determined that the image file with the greater cumulative size of matching logical subunits is unused, or that the image file with the greater cumulative size of matching logical subunits also has a greater cumulative size of matching logical subunits than other unused image files stored in the memory device 130.

In an example, it may be determined that there is a first non-matching identifying signature in the third image file associated with a first non-matching logical subunit not found in the first image file, and that the first non-matching logical subunit from the second memory may be deleted from the second memory. In an example, the method may be executed by the garbage collector 140 to find that there is at least one logical subunit in the image file with the greater cumulative size of matching logical subunits that does not match any logical subunit in the image file to be loaded, image file 150. The garbage collector 140 may further delete the non-matching logical subunit from the image file with the greater cumulative size of matching logical subunits.

In a further example, the garbage collector 140 may determine that there is another non-matching logical subunit, one that exists in the image file to be copied, image file 150, but is not present in the image file with the greater cumulative size of matching logical subunits. In an example, the garbage collector 140 performing the method may copy the second non-matching subunit from either the image repository 105 or from the memory device 130, and load the image file 150 to the memory device 130 using at least one logical subunit from the image file with the greater cumulative size of matching logical subunits that were not deleted. In another example method, a first quantity of matching identifying signatures between a third image file in the second memory and the first image and a second quantity of matching identifying signatures between a fourth image file in the second memory and the first image file is calculated. In an example, the garbage collector 140 may determine, for a plurality of the image files stored in the memory device 130, the quantity of logical subunits and associated identifying signatures from each of the plurality of image files stored in the memory device 130 that match logical subunits and associated identifying signatures from the image file to be loaded, image file 150.

In another example method, a determination may be made that the first quantity is greater than the second quantity. In an example, the garbage collector 140, may determine that one image file of the plurality of image files stored in the memory device 130 has a greater quantity of matching logical subunits with image file 150 than another image file of the plurality of image files stored in the memory device 130. In an example, it may be further determined that the image file with the greater quantity of matching logical subunits is unused, or that the image file with the greater quantity of matching logical subunits also has a greater quantity of matching logical subunits than other unused image files stored in the memory device 130.

In an example method, it may be determined that there is a first non-matching identifying signature in the third image file associated with a first non-matching logical subunit not found in the first image file, and that the first non-matching logical subunit from the second memory may be deleted from the second memory. In an example, the method may be executed by the garbage collector 140 to find that there is at least one logical subunit in the image file with the greater quantity of matching logical subunits that does not match any logical subunit in the image file to be loaded, image file 150. The garbage collector 140 may further delete the non-matching logical subunit from the image file with the greater quantity of matching logical subunits.

In a further example, the garbage collector 140 may determine that there is another non-matching logical subunit, one that exists in the image file to be copied, image file 150, but is not present in the image file with the greater quantity of matching logical subunits. In an example, the garbage collector 140 performing the method may copy the second non-matching subunit from either the image repository 105 or from the memory device 130, and load the image file 150 to the memory device 130 using at least one logical subunit from the image file with the greater quantity of matching logical subunits that were not deleted.

Figure 4:
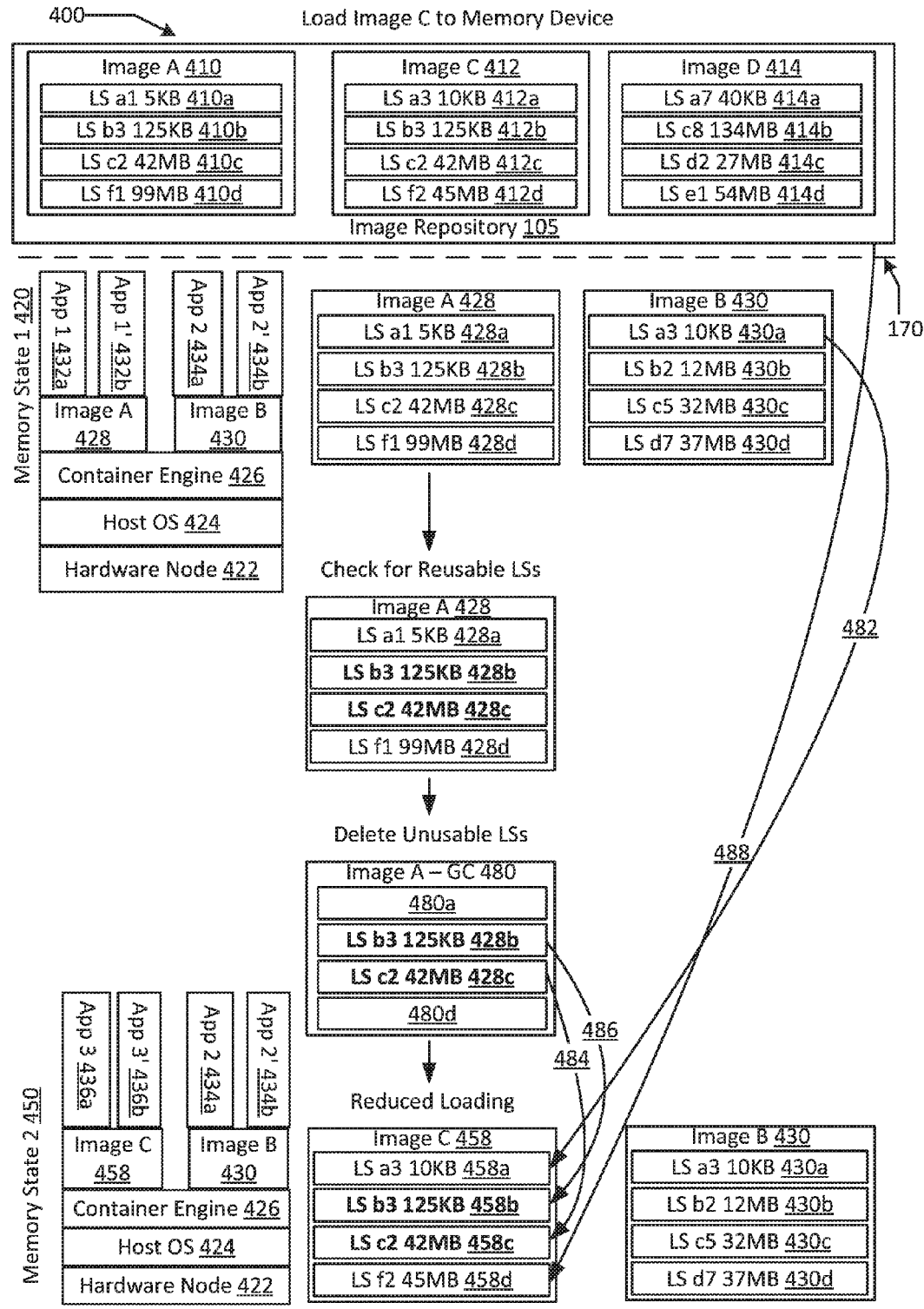
FIG. 4 is a block diagram showing an example of a system garbage collecting and loading an image file according to an example of the present disclosure.

FIG. 4 depicts a block diagram showing an example of a system garbage collecting and loading an image file according to an example of the present disclosure. FIG. 4 is an alternative example of FIG. 2 where, as an example, in system 400 there is an image repository 105 including image files 410, 412, and 414, which in turn include logical subunits 410a, 410b, 410c, 410d, 412a, 412b, 412c, 412d, 414a, 414b, 414c, and 414d, each of which is associated with a respective identifying signature not depicted. In an example, the hardware node 422 may include similar or equivalent components to hardware node 110 including the CPU 120, I/O 125, memory device 130 and garbage collector 140. The image repository 105 may be separated from the garbage collector 140 by a network 170 and may include metadata 180. The garbage collector 140 operates in the processors (CPU 120) of hardware node 210 which are connected to an I/O device 125 and memory devices 130. The system may further include a host operating system 424 (e.g., Windows, Linux, Solaris, etc.) and a container engine 426 (e.g., Docker container engine) which may be stored in the memory devices 130. In an example, the memory device may, in an initial memory state 420, store container engine 426 which may in turn host multiple image files 428 and 430 (e.g., Docker image files) which may be used to host multiple applications 432a, 432b, 434a, 434b (e.g., a program running in a virtual container such as a Docker container). Image files 428 and 430 may in turn include logical subunits 428a, 428b, 428c, 428d, 430a, 430b, 430c, and 430d, each of which is associated with a respective identifying signature not depicted.

In an example, the computer system 400, garbage collector 140 may receive an instruction from the I/O 125 to load image file 412 from the image repository 105, possibly over a network 170. In the illustrated example, the garbage collector 140 may receive information that applications 432a and 432b have been shut down and that image file 428 is currently unused. In an example, the garbage collector 140 may rank the image files stored in the memory device 130 by (i) an aggregate size of logical subunits with identifying signatures matching identifying signatures of a plurality of logical subunits of image file 412 and/or (ii) a total quantity of logical subunits with identifying signatures matching identifying signatures of a plurality of logical subunits of image file 412. In an example, the garbage collector 140 may also make the determination that the memory device 130 has insufficient capacity to store image file 412. In an example, the garbage collector 140 may use at least one of various factors to determine that image file 428 is a better candidate to be garbage collected or deleted than image file 430 in preparation to load image file 412 to the memory 130. Deletion factors may include, for example: that image file 428 is inactive while image file 430 is active, that image file 428 has a greater aggregate size of logical subunits with identifying signatures matching the identifying signatures of image file 412 than does image file 430 (logical subunit 428b matches logical subunit 412b and logical subunit 428c matches logical subunit 412c for a greater total size than logical subunit 430a matching logical subunit 412a), and/or that image file 428 has a greater total quantity of logical subunits with identifying signatures matching identifying signatures of image file 412 than does image file 430 (logical subunit 428b matches logical subunit 412b and logical subunit 428c matches logical subunit 412c for a greater total quantity than logical subunit 430a matching logical subunit 412a). In the example, upon determination that image file 428 is a suitable candidate for garbage collection, the garbage collector 140 may identify that logical subunits 428a and 428d do not match any logical subunits of image file 412. The garbage collector 140 may further proceed to delete logical subunits 428a and 428d.

In the illustrated example, after the garbage collector 140 deletes logical subunits 428a and 428d, a temporary garbage collected version of image file 428 may be in existence, labeled in the illustrated example as image file 480 with missing logical subunits 480a and 480d. In an example, the garbage collector 140 may determine that in order to load a copy of image file 412 to memory device 130, a source must be located for logical subunits 412a and 412d. In the illustrated example, the garbage collector 140 determines that logical subunit 430a is the equivalent of logical subunit 412a, that logical subunit 428b is the equivalent of logical subunit 412b, and that logical subunit 428c is the equivalent of logical subunit 412c, for example, by comparing the identifying signatures associated with the various logical subunits (e.g., checksums for the various Docker image file layers). The garbage collector 140 may further determine that there is no equivalent copy of logical subunit 412d located in any image file in the memory device 130.

In the illustrated example, upon making full determinations regarding a possible source for every logical subunit in image file 412, the garbage collector 140: i) copies logical subunit 430a to the memory device 130 (arrow 482) creating logical subunit 458a, ii) moves logical subunits 428b and 428c from the garbage collected image file 480 to create logical subunits 458b and 458c (arrows 484 and 486), and iii) retrieves logical subunit 412d, possibly over a network 170, to create logical subunit 458d in the memory device 130 (arrow 488); resulting in a reconstituted image file 458 which is an identical copy of image file 412 with logical subunits 458a, 458b, 458c, and 458d having identical identifying signatures as logical subunits 412a, 412b, 412c, and 412d. In the illustrated example, memory state 420 including image file 428 may be converted to memory state 450 including image file 458 in place of image file 428, where image file 458 may host new applications, for example, applications 436a and 436b. In the illustrated example, image file 430 and hosted applications 434a and 434b are unchanged throughout the method executed by the garbage collector 140.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of loading a first image file that includes a first plurality of logical subunits including a first logical subunit and a second logical subunit, where the first image file is associated with first metadata that includes a first identifying signature associated with the first logical subunit and a second identifying signature associated with the second logical subunit, the first image file being stored in a first memory, the method comprising:

receiving a request to load the first image file to a second memory;

retrieving, from the first metadata, the first identifying signature and the second identifying signature, wherein the first metadata is stored in a separate location from a content of the first image file;

retrieving, from a first plurality of image files stored in the second memory, a first plurality of identifying signatures, wherein each the image file of the first plurality of image files includes a respective second plurality of logical subunits, each of which is respectively associated with one of the first plurality of identifying signatures;

determining that the first identifying signature matches a third identifying signature from the first plurality of identifying signatures, wherein the third identifying signature is associated with a third logical subunit in a second image file of the first plurality of image files stored in the second memory;

determining whether the second identifying signature matches any of the first plurality of identifying signatures;
copying the first logical subunit from the matching third logical subunit in the second image file; and
loading the first image file into the second memory including using the copy of the first logical subunit from the matching third logical subunit.

2. The method of claim 1, further comprising:
determining that the second identifying signature matches a fourth identifying signature of the first plurality of identifying signatures, wherein the fourth identifying signature is associated with a fourth logical subunit in a third image file stored in the second memory;
copying the second logical subunit from the matching fourth logical subunit in the third image file; and
loading the first image file into the second memory including using the copy of the second logical subunit from the matching fourth logical subunit.

3. The method of claim 1, further comprising:
retrieving, from the second memory, a second plurality of identifying signatures, wherein there is a file including the second plurality of identifying signatures associated with a third plurality of logical subunits included within a second plurality of image files stored in the second memory.

4. The method of claim 1, wherein:
the first identifying signature and the second identifying signature are retrieved over a network.

5. The method of claim 4, further comprising:
determining that the second identifying signature does not match any identifying signature of the first plurality of identifying signatures;
copying the second logical subunit from the first memory; and
loading the first image file into the second memory including using the copy of the second logical subunit from the first memory.

6. The method of claim 1, further comprising:
loading the first image file into the second memory, wherein at least two logical subunits in the first image file are copied from one or more of the image files in the first plurality of image files stored in the second memory.

7. The method of claim 1, further comprising:
retrieving, an available storage capacity of the second memory, wherein the first image file has a size; and
determining, whether the available storage capacity is greater than the size of the first image file.

8. The method of claim 1, further comprising:
creating a ranking of a second plurality of image files stored in the second memory based on criteria including at least one of: an overlap of shared logical subunits with the first image file, an age of each respective image file, a frequency of use of each respective image file, and a size of each respective image file; and
proposing, at least one of an image file and a logical subunit to be deleted based on the ranking.

9. The method of claim 8, further comprising:
deleting, the at least one of the image file and the logical subunit.

10. The method of claim 1, further comprising:
creating a ranking of a second plurality of image files stored in the second memory based on at least one of (i) an aggregate size of logical subunits with identifying signatures matching identifying signatures of the first plurality of logical subunits of the first image file and (ii) a total quantity of logical subunits with identifying signatures matching identifying signatures of the first plurality of logical subunits of the first image file.

11. The method of claim 10, further comprising:
determining a first list of logical subunits, wherein each member of the first list is a logical subunit included in a third image file in the second memory, each member of the first list having a size and an associated identifying signature that matches any identifying signature of the first image file;
determining a second list of logical subunits, wherein each member of the second list is a logical subunit included in a fourth image file in the second memory, each member of the second list having a size and an associated identifying signature that matches any identifying signature of the first image file;
determining a first cumulative size based on a first sum of respective sizes of each logical subunit in the first list;
determining a second cumulative size based on a second sum of respective sizes of each logical subunit in the second list;
determining that the first cumulative size is greater than the second cumulative size;
determining that there is a first non-matching identifying signature in the third image file associated with a first non-matching logical subunit not found in the first image file; and
deleting the first non-matching logical subunit from the second memory.

12. The method of claim 11, further comprising:
determining that there is a second non-matching identifying signature in the first image file associated with a second non-matching logical subunit not found in the third image file;
copying, from at least one of the first memory and the second memory, the second non-matching logical subunit; and
loading the first image file into the second memory including using at least one logical subunit from the third image file.

13. The method of claim 10, further comprising:
calculating a first quantity of matching identifying signatures between a third image file in the second memory and the first image file;
calculating a second quantity of matching identifying signatures between a fourth image file in the second memory and the first image file;
determining that the first quantity is greater than the second quantity;
determining that there is a first non-matching identifying signature in the third image file associated with a first non-matching logical subunit not found in the first image file; and
deleting the first non-matching logical subunit from the second memory.

14. The method of claim 13, further comprising:
determining that there is a second non-matching identifying signature in the first image file associated with a second non-matching logical subunit not found in the third image file;
copying, from at least one of the first memory and the second memory, the second non-matching logical subunit; and
loading the first image file into the second memory including using at least one logical subunit from the third image file.

15. A system for loading a first image file, the system comprising;
  a first memory and a second memory;
  one or more processors, in communication with the first and the second memory;
  a garbage collector, executing on the one or more processors, including:
    an input/output module; and
    a garbage collector engine,
  wherein the one or more processors:
    receive, from the input/output module, a request to load a first image file stored in the first memory to the second memory, the first image including a first plurality of logical subunits including a first logical subunit and a second logical subunit, where the first image file is associated with a first metadata that includes a first identifying signature associated with the first logical subunit and a second identifying signature associated with the second logical subunit;
    retrieve, by the garbage collector, from the first metadata the first identifying signature and the second identifying signature, wherein the first metadata is stored in a separate location from a content of the first image file;
    retrieve, by the garbage collector, from a first plurality of image files stored in the second memory, a first plurality of identifying signatures, wherein each image file of the first plurality of image files includes a respective second plurality of logical subunits, each of which is respectively associated with one of the first plurality of identifying signatures;
    determine, by the garbage collector, that the first identifying signature matches a third identifying signature from the first plurality of identifying signatures, wherein the third identifying signature is associated with a third logical subunit in a second image file of the first plurality of image files stored in the second memory;
    determine, by the garbage collector, whether the second identifying signature matches any of the first plurality of identifying signatures;
    copy, by the garbage collector, the first logical subunit from the matching third logical subunit in the second image file to the second memory; and
    load, by the garbage collector, the first image file into the second memory including using the copy of the first logical subunit from the matching third logical subunit.

16. The system of claim 15, wherein the first identifying signature and the second identifying signature are retrieved over a network, and
  wherein the one or more processors:
    determine, by the garbage collector, that the second identifying signature does not match any of the first plurality of identifying signatures,
    copy, by the garbage collector, the second logical subunit from the first memory to the second memory, and
    load, by the garbage collector, the first image file into the second memory including using the copy of the second logical subunit from the first memory.

17. The system of claim 15, wherein the first image file has a size and the second memory has an available storage capacity, and
  wherein the one or more processors retrieve, by the garbage collector, the available storage capacity of the second memory.

18. The system of claim 17, wherein the one or more processors:
    create, by the garbage collector, a ranking of a second plurality of image files stored in the second memory based on criteria including at least one of: an overlap of shared logical subunits with the first image file, an age of each respective image file, a frequency of use of each respective image file, and a size of each respective image file,
    determine, by the garbage collector, whether the available storage capacity is greater than the size of the first image file,
    responsive to determining that the available storage capacity is not greater than the size of the first image file,
    propose, by the input/output module, at least one of an image file and a logical subunit to be deleted based on the ranking, and
    delete, by the garbage collector, at least one of the image file and the logical subunit.

19. The system of claim 17, wherein the one or more processors:
    create, by the garbage collector, a ranking of a second plurality of image files stored in the second memory based on at least one of (i) an aggregate size of logical subunits with identifying signatures matching identifying signatures of the first plurality of logical subunits of the first image file and (ii) a total quantity of logical subunits with identifying signatures matching identifying signatures of the first plurality of logical subunits of the first image file;
    determine, by the garbage collector, whether the available storage capacity is greater than the size of the first image file;
    responsive to determining that the available storage capacity is not greater than the size of the first image file, determine, by the garbage collector, a third image file in the second memory, the third image file having at least one of:
      (i) a first cumulative size of logical subunits associated with identifying signatures that match the identifying signatures of any identifying signature of the first image file; and
      (ii) a first cumulative quantity of logical subunits associated with identifying signatures that match the identifying signatures of any identifying signature of the first image file,
      wherein at least one of the first cumulative size and the first cumulative quantity is greater than a respective second cumulative size or a respective second cumulative quantity associated with a different image file of the second plurality of image files;
    determine, by the garbage collector, that the third image file includes a non-matching identifying signature associated with a non-matching logical subunit not found in the first image file; and
    delete, by the garbage collector, the non-matching logical subunit from the second memory.

20. A computer-readable non-transitory storage medium storing executable instructions for loading an image file, which when executed by a computer system, cause the computer system to:
    receive, a request to load a first image file stored in a first memory to a second memory, a first image including a first plurality of logical subunits including a first logical subunit and a second logical subunit, where the first image file is associated with a first metadata that includes a first identifying signature associated with the first logical subunit and a second identifying signature associated with the second logical subunit;

retrieve, from the first metadata, the first identifying signature and the second identifying signature, wherein the first metadata is stored in a separate location from a content of the first image file;

retrieve, from a first plurality of image files stored in the second memory, a first plurality of identifying signatures, wherein each image file of the first plurality of image files includes a respective second plurality of logical subunits, each of which is respectively associated with one of the first plurality of identifying signatures;

determine that the first identifying signature matches a third identifying signature from the first plurality of identifying signatures, wherein the third identifying signature is associated with a third logical subunit in a second image file of the first plurality of image files stored in the second memory;

determine whether the second identifying signature matches any of the first plurality of identifying signatures;

copy the first logical subunit from the matching third logical subunit in the second image file; and load the first image file into the second memory including using the copy of the first logical subunit from the matching third logical subunit.

* * * * *

UNITED STATES PATENT AND TRADEMARK OFFICE
CERTIFICATE OF CORRECTION

PATENT NO. : 10,366,091 B2  
APPLICATION NO. : 15/240736  
DATED : July 30, 2019  
INVENTOR(S) : Chen et al.

Page 1 of 1

It is certified that error appears in the above-identified patent and that said Letters Patent is hereby corrected as shown below:

In the Claims

In Column 12, Line 57 (Claim 1), replace "each the image file" with --each image file--.

Signed and Sealed this
First Day of October, 2019

Andrei Iancu
*Director of the United States Patent and Trademark Office*